United States Patent
Sekiguchi et al.

(10) Patent No.: US 12,322,962 B2
(45) Date of Patent: Jun. 3, 2025

(54) POWER SUPPLY SYSTEM AND ELECTRICITY STORAGE DEVICE

(71) Applicant: FDK CORPORATION, Tokyo (JP)

(72) Inventors: Kunihisa Sekiguchi, Tokyo (JP); Naoaki Konda, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 18/558,733

(22) PCT Filed: Feb. 3, 2022

(86) PCT No.: PCT/JP2022/004205
§ 371 (c)(1),
(2) Date: Nov. 2, 2023

(87) PCT Pub. No.: WO2022/264485
PCT Pub. Date: Dec. 22, 2022

(65) Prior Publication Data
US 2024/0243572 A1  Jul. 18, 2024

(30) Foreign Application Priority Data
Jun. 15, 2021  (JP) ................. 2021-099273

(51) Int. Cl.
*H02J 1/10* (2006.01)
*H02J 7/34* (2006.01)

(52) U.S. Cl.
CPC ............ *H02J 1/106* (2020.01); *H02J 7/34* (2013.01)

(58) Field of Classification Search
CPC ............ H02J 1/106; H02J 7/34; Y02E 60/10
(Continued)

(56) References Cited

U.S. PATENT DOCUMENTS

| 5,783,322 A | * | 7/1998 | Nagai | H01M 10/48 |
| | | | | 429/61 |
| 6,043,626 A | * | 3/2000 | Snyder | H02J 7/0044 |
| | | | | 379/442 |

(Continued)

FOREIGN PATENT DOCUMENTS

| JP | H01218334 A | 8/1989 |
| JP | H10257692 A | 9/1998 |

(Continued)

OTHER PUBLICATIONS

International Search Report and Written Opinion dated Apr. 5, 2022, for corresponding PCT Application No. PCT/JP2022/004205.

(Continued)

*Primary Examiner* — Richard Tan
(74) *Attorney, Agent, or Firm* — Kinney & Lange, P.A.

(57) ABSTRACT

When DC power to be supplied from a main power supply device drops and a voltage to be input to a load falls below a predetermined threshold value, a microcomputer controls a switch unit so as to start an ON-operation for supplying the DC power from a sub power supply device to the load, and when the DC power to be supplied from the main power supply device recovers, the microcomputer controls the switch unit so as to start an OFF-operation for restricting the DC power to be supplied from the sub power supply device to the load, restrict supply of the DC power from the sub power supply device to the load so that a voltage to be input to the load does not fall below a predetermined threshold value until a predetermined time has elapsed since start of the OFF-operation, and set supply of the DC power from the sub power supply device to the load to zero after the predetermined time has elapsed.

10 Claims, 3 Drawing Sheets

(58) Field of Classification Search
USPC .......................................................... 307/43
See application file for complete search history.

(56) References Cited

U.S. PATENT DOCUMENTS

2014/0117767 A1* 5/2014 Yang .................... H02J 7/0031
307/77
2015/0035369 A1 2/2015 He et al.

FOREIGN PATENT DOCUMENTS

| JP | 2001251771 A | 9/2001 |
| WO | 2014156041 A1 | 10/2014 |
| WO | 2018127946 A1 | 7/2018 |

OTHER PUBLICATIONS

Extended European Search Report dated Jan. 15, 2025, for corresponding European Patent Application No. 22824486.9, 7 pgs.

* cited by examiner

POWER SUPPLY SYSTEM AND ELECTRICITY STORAGE DEVICE

CROSS-REFERENCE TO RELATED APPLICATION(S)

This application is a U.S. National Stage Application of PCT International Application No. PCT/JP2022/004205, filed on Feb. 3, 2022, entitled "POWER SUPPLY SYSTEM AND ELECTRICITY STORAGE DEVICE," which claims priority to the Japanese Patent Application No. 2021-099273, filed on Jun. 15, 2021, entitled "POWER SUPPLY SYSTEM AND ELECTRICITY STORAGE DEVICE," which are incorporated herein by reference in their entireties.

BACKGROUND

Technical Field

The present disclosure relates to a power supply system and an electricity storage device.

Background Art

There is generally known a power supply system for supplying power to a load such as Patent Document 1 described below. Such a power supply system includes a main power supply path for supplying power to a load, and a sub power supply path that functions as a backup for the main power supply path. The main power supply path converts power input from an external power source into power that can be supplied to the load, and supplies the converted power to the load. Further, when the power supply from the main power supply path to the load decreases (for example, when a power failure occurs in the main power supply path), the sub power supply path discharges a battery incorporated in the sub power supply path and supplies power to the load instead of the main power supply path.

In the above power supply system, after the power failure occurs in the main power supply path, during the time when power supply from the sub power supply path to the load is stopped and power is then supplied from the main power supply path to the load again (i.e., when a power recovery operation for switching from the sub power supply path to the main power supply path is performed), the voltage of the power supply path drops sharply. As a result, the power supply system has a problem that the voltage to be input to the load falls below a predetermined threshold, and power supply to the load from the sub power supply path is then started again.

Suddenly stopping the power supply from the sub power supply path to the load in the power recovery operation is considered as a factor that causes the voltage of the power supply path to drop sharply. In the above-described power supply system, when the power supply from the sub power supply path to the load is suddenly stopped, it causes a sharp voltage drop in the power supply path of the power supply system, that is, causes a phenomenon that the voltage to be input to the load drops sharply.

PRIOR ART DOCUMENT

Patent Document

Patent Document 1: Japanese Patent Laid-Open No. 2001-251771

SUMMARY

The present disclosure has been made in consideration of such circumstances, and has an object to provide a power supply system that can implement a smooth power recovery operation by taking a countermeasure to prevent sharp voltage drop in a power supply path of the power supply system, and an electricity storage device for use in the power supply system.

The present disclosure has been made to achieve at least part of the above-described object, and can be implemented as the following aspect.

A power supply system according to the present aspect comprises: a main power supply device that supplies DC power to a load; a sub power supply device that is connected in parallel to the main power supply device and causes a built-in battery to discharge, thereby supplying DC power to the load; a switch unit that is provided in an electrical path extending from the sub power supply device to the load through which discharge current of the battery flows, and performs an ON-operation and an OFF-operation; and a microcomputer that controls the ON-operation and the OFF-operation of the switch unit, wherein when the DC power to be supplied from the main power supply device drops and a voltage to be input to the load falls below a predetermined threshold value, the microcomputer controls the switch unit so as to start the ON-operation for supplying the DC power from the sub power supply device to the load, and when the DC power to be supplied from the main power supply device recovers, the microcomputer controls the switch unit so as to start the OFF-operation for restricting the DC power to be supplied from the sub power supply device to the load, restrict supply of the DC power from the sub power supply device to the load so that the voltage to be input to the load does not fall below a predetermined threshold value until a predetermined time has elapsed since start of the OFF-operation, and set supply of the DC power from the sub power supply device to the load to zero after the predetermined time has elapsed. Further, an electricity storage device comprising the sub power supply device, the switch unit and the microcomputer is provided.

The power supply system according to this aspect and the electricity storage device for use in the power supply system can implement a smooth power recovery operation.

DETAILED DESCRIPTION

A power supply system and an electricity storage device according to an embodiment will be described below with reference to the drawings. It should be noted that the present embodiment is not limited to the contents described below, and can be arbitrarily changed and implemented without changing the gist thereof. Further, the drawings used to describe the embodiments schematically show the components, and are partially emphasized, enlarged, reduced, or omitted in order to deepen understanding, and may not accurately represent the reduced scale, shape, etc., of the components.

First Embodiment

Figure 1:
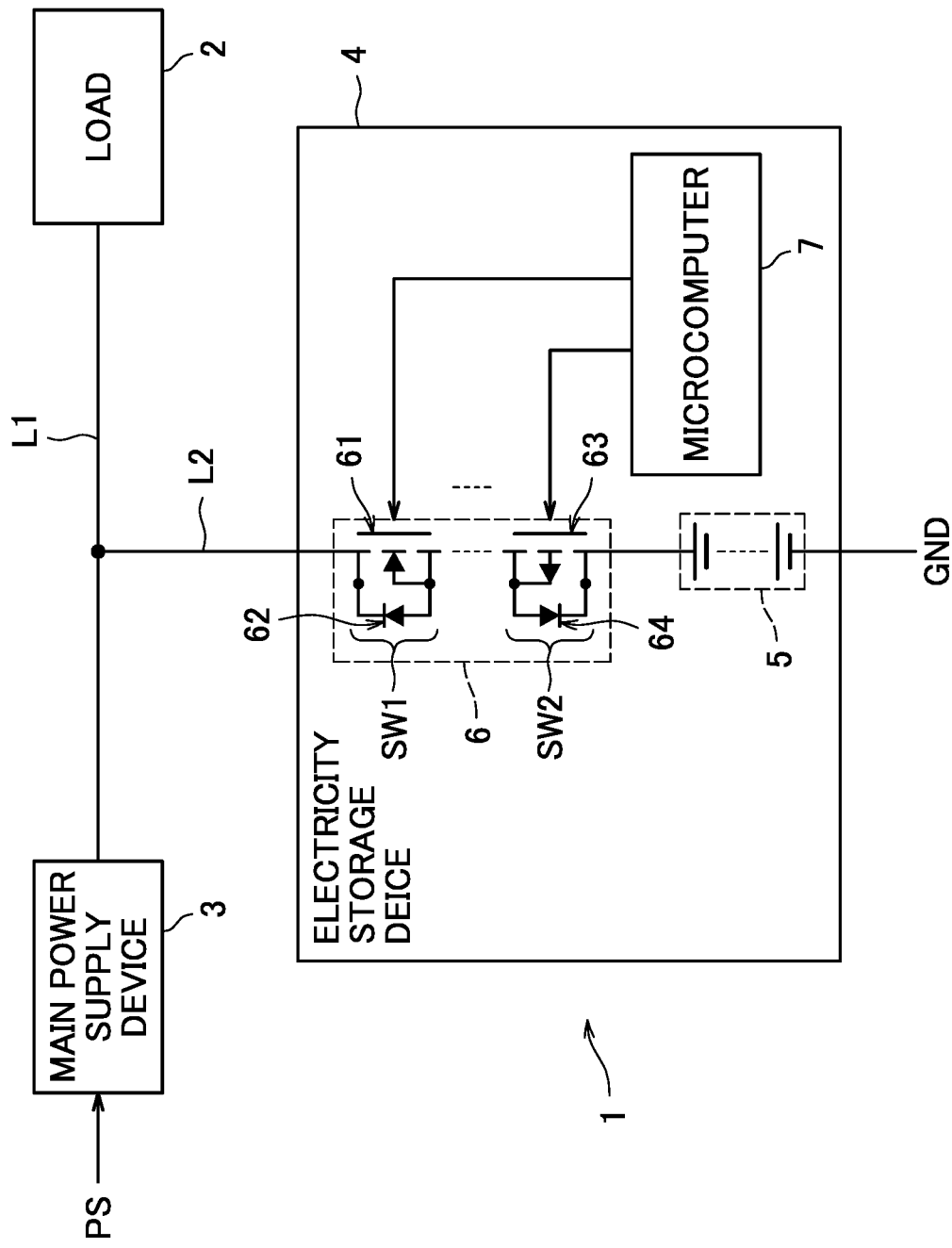
FIG. 1 is a block diagram showing a power supply system according to a first embodiment.

FIG. 1 is a block diagram showing a power supply system 1 according to a first embodiment. The power supply system 1 shown in FIG. 1 converts power supplied from an external power supply PS into DC power that can be supplied to a load 2, and supplies the DC power to the load 2 as its overall function. Further, when the power supply from the external power supply PS to the load 2 decreases (for example, when the power supply from the external power supply PS to the load 2 stops due to a power failure or the like), the power supply system 1 discharges a built-in battery and supplies DC power accumulated in the battery to the load 2.

Therefore, the power supply system 1 according to the present embodiment includes a main power supply device 3 and an electricity storage device 4 as shown in FIG. 1. The main power supply device 3 in the present embodiment is connected to the load 2 via an electrical path L1. The main power supply device 3 converts the power supplied from the external power supply PS into DC power that can be supplied to the load 2, and supplies the DC power to the load 2.

The electricity storage device 4 in the present embodiment is connected to the electrical path L1 via an electrical path L2. The electricity storage device 4 includes a sub power supply device 5, a switch unit 6 and a microcomputer 7. The sub power supply device 5 is connected in parallel to the main power supply device 3, discharges a battery built in the sub power supply device 5, and supplies DC power to the load 2.

The switch unit 6 is provided in the electrical path L2 extending from the sub power supply device 5 to the load 2 through which discharge current of the battery flows. The switch unit 6 performs an ON-operation and an OFF-operation under the control of the microcomputer 7. Here, the switch unit 6 in the present embodiment includes at least one first switching element SW1 and at least one second switching element SW2 that are connected in series. In other words, the respective numbers of the first switching elements SW1 and the second switching elements SW2 included in the switch unit 6 in the present embodiment can be appropriately changed as necessary.

Further, the first switching element SW1 includes a connecting/disconnecting unit 61 that connects/disconnects the electrical path L2, and a diode unit 62 connected in parallel to the connecting/disconnecting unit 61. The second switching element SW2 includes a connecting/disconnecting unit 63 that connects/disconnects the electrical path L2, and a diode unit 64 that is connected in parallel to the connecting/disconnecting unit 63. The diode units 62 and 64 allow current to pass in only one direction.

Further, in the first switching element SW1, the diode unit 62 is set in a forward direction so as to pass the discharge current of the battery therethrough. In other words, a forward voltage is applied to the diode unit 62 of the first switching element SW1 by the output from the battery. In addition, in the second switching element SW2, the diode unit 64 is set in a reverse direction so as to cut off the discharge current of the battery. In other words, a reverse voltage is applied to the diode unit 64 of the second switching element SW2 by the output from the battery.

The microcomputer 7 includes a predetermined processor as a hardware resource. The microcomputer 7 controls the ON-operation and the OFF-operation of the switch unit 6. Here, the control of the ON-operation and the OFF-operation of the switch unit 6 that is executed in the microcomputer 7 in the present embodiment will be described. In the following description, "to open the connecting/disconnecting unit" means that the connection of the connecting/disconnecting unit is cut off so as to prohibit a current from flowing therethrough, and "to close the connecting/disconnecting unit" means that the connecting/disconnecting unit is connected so as to allow a current to flow therethrough.

(Control of ON-Operation of Switch Unit by Microcomputer)

First, since the main power supply device 3 and the electricity storage device 4 are connected in parallel, the microcomputer 7 can detect a value of a voltage output from the main power supply device 3 (in other words, the value of the voltage input to the load 2). The microcomputer 7 controls the switch unit 6 such that the ON-operation for supplying DC power from the sub power supply device 5 to the load 2 is started when the voltage input to the load 2 becomes less than a preset predetermined threshold value. Specifically, the microcomputer 7 controls the switch unit 6 so as to close each of the connecting/disconnecting unit 61 of the first switching element SW1 and the connecting/disconnecting unit 63 of the second switching element SW2 in the ON-operation.

As a result, the power supply system 1 according to the present embodiment can supply DC power from the sub power supply device 5 to the load 2 instead of the main power supply device 3 when the power supply from the main power supply device 3 to the load 2 decreases (for example, when a power failure occurs in the main power supply device 3).

(Control of OFF-Operation of Switch Unit by Microcomputer)

Next, when DC power to be supplied from the main power supply device 3 to the load 2 is recovered, the microcomputer 7 starts the OFF-operation for limiting DC power to be supplied from the sub power supply device 5 to the load 2 (in other words, starts a power recovery operation). At this time, the microcomputer 7 restricts the supply of DC power from the sub power supply device 5 to the load 2 so that the voltage to be input to the load 2 does not fall below a predetermined threshold value until a predetermined time has elapsed since the start of the OFF-operation.

Specifically, in the OFF-operation, the microcomputer 7 opens the connecting/disconnecting unit 61 of at least one first switching element SW1 until the predetermined time has elapsed from the start of the OFF-operation. Further, the microcomputer 7 closes the connecting/disconnecting unit 63 of the second switching element SW2.

Finally, the microcomputer 7 controls the switch unit 6 so that the supply of DC power from the sub power supply device 5 to the load 2 is set to zero after the predetermined time has elapsed. Specifically, after the predetermined time has elapsed, the switch unit 6 is controlled so as to open each of the connecting/disconnecting unit 61 of the first switching element SW1 and the connecting/disconnecting unit 63 of the second switching element SW2.

The OFF-operation of the switch unit 6 is controlled by the microcomputer 7, whereby a forward voltage is applied to the diode unit 62 corresponding to the opened connecting/disconnecting unit 61, so that the voltage value of the DC power to be supplied from the sub power supply device 5 to the load 2 decreases. For example, when the first switching element SW1 is configured by an MOSFET, the parasitic diode is used as the diode unit 62, and only one first switching element SW1 is opened, the voltage value of the DC power to be supplied from the sub power supply device 5 to the load 2 decreases by approximately 0.6 V. In other words, the power supply system 1 according to the present embodiment can reduce the voltage value of the DC power to be supplied from the sub power supply device 5 to the load 2 to restrict the discharge current until the predetermined time has elapsed, so that the voltage to be input to the load 2 can be prevented from falling below the predetermined threshold value.

Further, in the power supply system 1 according to the present embodiment, a plurality of the first switching elements SW1 are connected in series, and the number of the first switching elements SW1 whose connecting/disconnecting units 61 are opened is changed according to the voltage of each first switching element SW1 to be input to the load 2, whereby the power supply system 1 according to the present embodiment can gently reduce the discharge current to zero. In other words, the power supply system 1 according to the present embodiment can more reliably prevent the voltage to be input to the load 2 from falling below the predetermined threshold value.

Further, in the OFF-operation, the microcomputer 7 may repeatedly perform an operation of closing or opening only the connecting/disconnecting unit 63 of the second switching element SW2 or both the connecting/disconnecting unit 61 of the first switching element SW1 and the connecting/disconnecting unit 63 of the second switching element SW2 according to a preset duty ratio until the predetermined time has elapsed since the start of the OFF-operation. Here, the duty ratio in the present embodiment indicates the ratio of a closing period and an opening period of each of the connecting/disconnecting unit 61 of the first switching element SW1 and the connecting/disconnecting unit 63 of the second switching element SW2.

Figure 2:
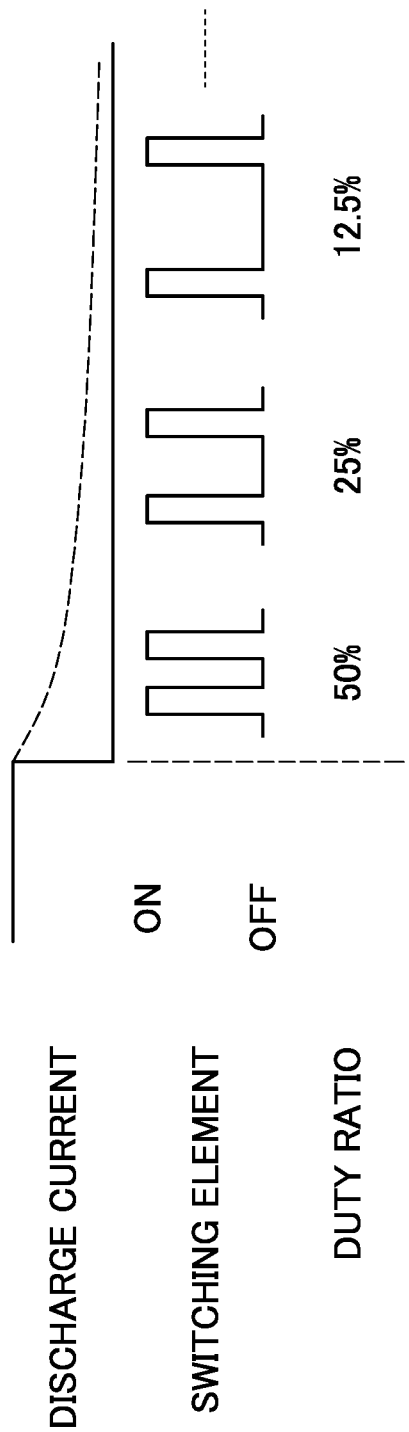
FIG. 2 is a schematic diagram showing a duty ratio to be used in the power supply system shown in FIG. 1.

Note that the closing or opening of the connecting/disconnecting unit 61 and the connecting/disconnecting unit 63 may be set to be repeated at a constant cycle until the predetermined time has elapsed since the start of the OFF-operation, but the following operation may also be performed. In other words, the microcomputer 7 stores a plurality of duty ratios in advance as shown in FIG. 2. The microcomputer 7 selects a duty ratio from the plurality of duty ratios in order from a duty ratio having a largest closing period ratio to a duty ratio having a smallest closing period ratio. The microcomputer 7 repeats the operation of the closing or opening the connecting/disconnecting unit 61 of the first switching element SW1 and the connecting/disconnecting unit 63 of the second switching element SW2 according to the selected duty ratio.

By controlling the OFF-operation of the switch unit 6 by the microcomputer 7, as shown in FIG. 2, the discharge current output from the sub power supply device 5 gently decreases, so that the voltage value of the DC power supplied from the sub power supply device 5 to the load 2 also gently decreases. In other word, the power supply system 1 according to the present embodiment can more reliably prevent the voltage to be input to the load 2 from falling below the predetermined threshold value.

As a result, the power supply system 1 according to the present embodiment can more reliably prevent a sharp voltage drop in the power supply path of the power supply system 1 (that is, the sharp drop of the voltage to be input to the load 2) in the OFF-operation. In other words, the power supply system 1 according to the present embodiment can prevent that the voltage to be input to the load falls below the predetermined threshold value and the power supply from the sub power supply path to the load starts again.

Therefore, the power supply system 1 according to the present embodiment can implement a smooth power recovery operation.

Second Embodiment

Figure 3:
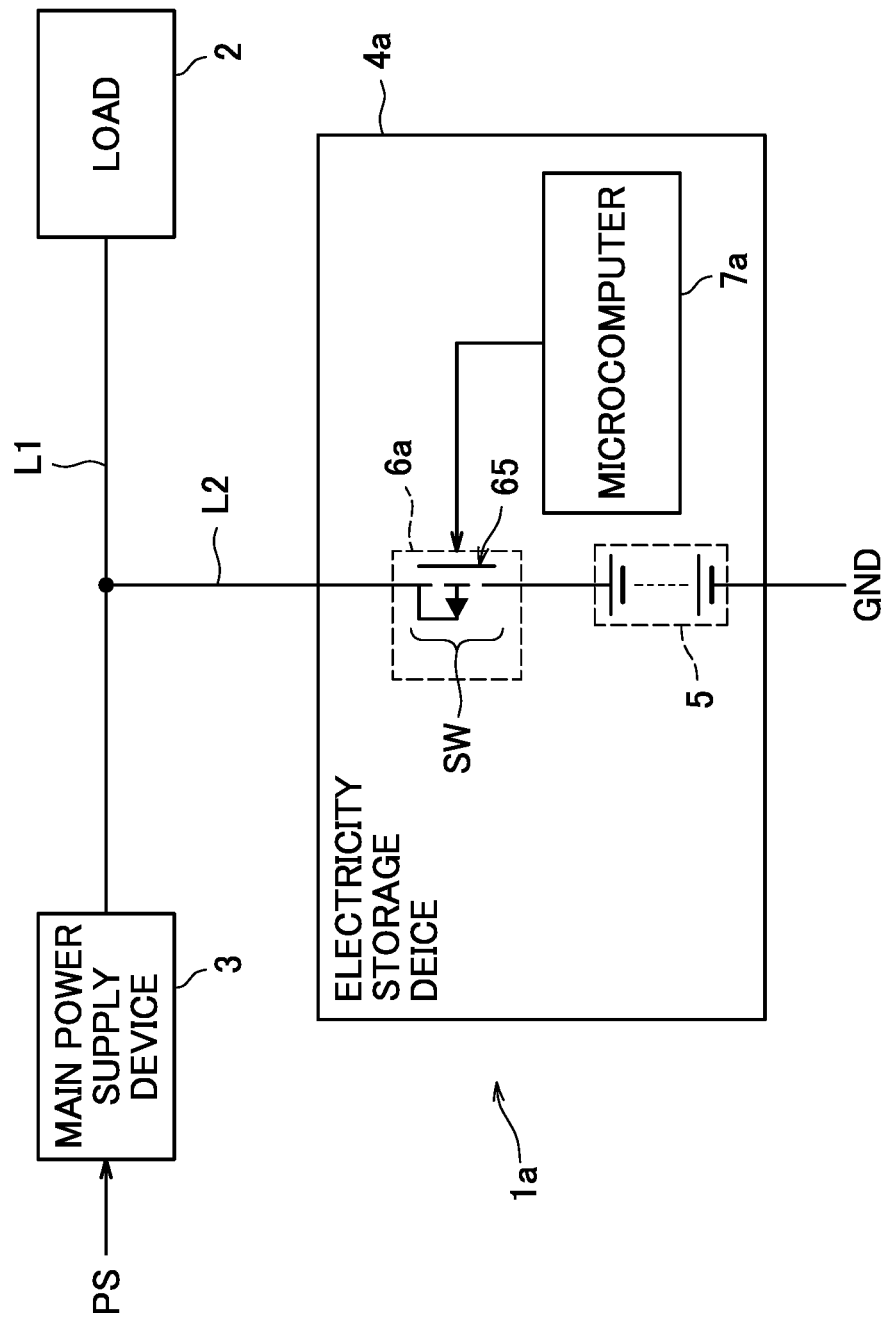
FIG. 3 is a block diagram showing a power supply system according to a second embodiment.

FIG. 3 is a block diagram showing a power supply system 1a according to a second embodiment. Note that for convenience of description, detailed description of each configuration of the power supply system 1a according to the second embodiment which is substantially the same as each configuration of the power supply system 1 according to the first embodiment will be omitted, and will be made as necessary.

Like the power supply system 1 shown in FIG. 1, the power supply system 1a shown in FIG. 3 supplies power supplied from an external power supply PS into DC power that can be supplied to a load 2, and supplies the DC power to the load 2. Further, when the power supply from the external power supply PS decreases (for example, when the power supply from the external power supply PS to the load 2 stops due to a factor such as a power failure), the power supply system 1a discharges a built-in battery to supply DC power accumulated in the battery to the load 2.

The power supply system 1a according to the present embodiment includes a main power supply device 3 and an electricity storage device 4a as shown in FIG. 3. The main power supply device 3 in the present embodiment is the same as the main power supply device 3 in the first embodiment.

The electricity storage device 4a in the present embodiment is connected to an electrical path L1 via an electrical path L2. The electricity storage device 4a includes a sub power supply device 5, a switch unit 6a, and a microcomputer 7a. The sub power supply device 5 is the same as the sub power supply device 5 in the first embodiment.

The switch unit 6a is provided in the electrical path L2 extending from the sub power supply device 5 to the load 2 through which the discharge current of the battery flows. The switch unit 6a performs an ON-operation and an OFF-operation under the control of the microcomputer 7a. Here, the switch unit 6a in the present embodiment includes one switching element SW. Further, the switching element SW includes a connecting/disconnecting unit 65 for connecting/disconnecting the electrical path L2.

The microcomputer 7a includes a predetermined processor as a hardware resource. The microcomputer 7a controls the ON-operation and the OFF-operation of the switch unit 6a. Here, the control of the ON-operation and the OFF-operation of the switch unit 6a to be executed by the microcomputer 7a in the present embodiment will be described.

(Control of ON-Operation of Switch Unit by Microcomputer)

First, since the main power supply device 3 and the electricity storage device 4 are connected in parallel, the microcomputer 7a can detect a value of a voltage output from the main power supply device 3 (in other words, the value of the voltage to be input to the load 2). The microcomputer 7a controls the switch unit 6a such that when the voltage input to the load 2 becomes less than a preset predetermined threshold value, the microcomputer 7a starts the ON-operation for supplying DC power from the sub power supply device 5 to the load 2. Specifically, the microcomputer 7 controls the switch unit 6a so as to close the connecting/disconnecting unit 65 of the switching element SW in the ON-operation.

As a result, when the power supply from the main power supply device 3 to the load 2 is reduced (for example, when a power failure occurs in the main power supply device 3), the power supply system 1a according to the present embodiment can supply DC power from the sub power supply device 5 of the electricity storage device 4a to the load 2 instead of the main power supply device 3.

(Control of OFF-Operation of Switch Unit by Microcomputer)

Next, when the DC power to be supplied from the main power supply device 3 to the load 2 is recovered, the microcomputer 7a starts the OFF-operation for restricting the DC power to be supplied from the sub power supply device 5 to the load 2 (in other words, starts a power recovery operation). At this time, the microcomputer 7a restricts the supply of the DC power from the sub power supply device 5 to the load 2 so that the voltage to be input to the load 2 does not fall below a predetermined threshold value until a predetermined time has elapsed since the start of the OFF-operation.

For example, in the OFF-operation, the microcomputer 7a may repeatedly execute an operation of closing or opening the connecting/disconnecting unit 65 of the switching element SW according to a preset duty ratio until the predetermined time has elapsed since the start of the OFF-operation. Here, the duty ratio in the present embodiment indicates the ratio of a closing period and an opening period of the connecting/disconnecting unit 65 of the switching element SW.

Note that the closing or opening of the connecting/disconnecting unit 65 may be repeated at a constant cycle from the start of the OFF-operation until the lapse of a predetermined period of time, but the following operation may also be performed. Specifically, the microcomputer 7a stores a plurality of duty ratios in advance as shown in FIG. 2. The microcomputer 7a selects a duty ratio from the plurality of duty ratios in order from a duty ratio having a largest closing period ratio to a duty ratio having a smallest closing period ratio. The microcomputer 7 repeats the operation of closing or opening the connecting/disconnecting unit 65 of the switching element SW according to the selected duty ratio.

By controlling the OFF-operation of the switch unit 6a by the microcomputer 7a, as shown in FIG. 2, the discharge current of the sub power supply device 5 gently decreases, so that the voltage value of the DC power to be supplied from the sub power supply device 5 of the electricity storage device 4a to the load 2 also gently decreases. In other words, the power supply system 1a according to the present embodiment can more reliably prevent the voltage to be input to the load 2 from falling below the predetermined threshold value.

As a result, the power supply system 1a according to the present embodiment can more reliably prevent a sharp voltage drop in the power supply path of the power supply system 1a (that is, the sharp drop in the voltage input to the load 2) in the OFF-operation. In other words, the power supply system 1a according to the present embodiment can prevent that the voltage input to the load falls below the predetermined threshold value and the power supply from the sub power supply path to the load starts again.

Therefore, the power supply system 1 according to the present embodiment can implement a smooth power recovery operation.

Here, the battery in the above embodiments is a generally known primary battery such as a manganese battery, an alkaline battery or a lithium battery, or a generally known secondary battery such as a nickel-metal hydride battery or a lithium ion battery. Also, the battery may be a single cell or an assembled battery.

Further, the external power supply PS in the above embodiments may be a domestic power supply or a commercial power supply. Further, the external power supply PS may be a power supply capable of supplying DC power or a power supply capable of supplying AC power. In other words, the power supply system 1 according to the above-described embodiments can appropriately change the internal configuration according to the type of the external power supply PS and the power that can be used by the load 2. At this time, the main power supply device 3 in the above embodiments can be appropriately changed according to the type of the external power supply PS and the power that can be used in the load 2. For example, the main power supply device 3 in the above embodiments may include a rectifier, an AC-DC converter, or a DC-DC converter.

Further, the main power supply device 3 in the above embodiments converts the power supplied from the external power supply PS into DC power that can be supplied to the load 2, and supplies the DC power to the load 2. However, the power supply systems 1 and 1a according to the above embodiments are not limited to this style. For example, the main power supply device 3 in the above embodiments may be equipped with a power generation facility for generating DC power or a power supply facility such as the above battery.

Further, the load 2 in the above embodiments is assumed to be, for example, a circuit breaker for a train or other devices that are required to operate for a certain period of time when the power supply from the external power source PS is stopped.

Further, the first switching element SW1, the second switching element SW2, and the switching element SW in the above embodiments may be generally known semiconductor switching elements such as bipolar transistors, junction FETs, MOSFETs, and IGBTs. Further, the first switching element SW1 in the above embodiment may have the diode unit 62 as a parasitic diode present in the first switching element SW1.

FIGS. 1 and 3 show the power supply systems 1 and 1a including electricity storage devices 4 and 4a using an n-channel MOSFET and a p-channel MOSFET as the first switching element SW1 and the second switching element SW2. However, the power supply systems 1 and 1a according to the above embodiments are not limited to this style. For example, the power supply systems 1 and 1a according to the above-described embodiments may include electricity storage devices 4 and 4a configured by combining various generally known switching elements as described above.

Further, the term "predetermined processor" used in the above description means, for example, a dedicated or general-purpose processor such as a CPU (central processing unit) or an MPU (micro processing unit), or an application-specific integrated circuit (ASIC), a programmable logic device (for example, a simple programmable logic device (SPLD), a complex programmable logic device (CPLD)), or a field programmable gate array (FPGA). Further, each component (each processing unit) of the present embodiments may be implemented by a plurality of processors instead of a single processor. Furthermore, a plurality of components (a plurality of processing units) may be implemented by a single processor.

Although the embodiments have been described above, the embodiments are presented as examples and are not intended to limit the scope of the invention. These novel embodiments can be embodied in various other forms, and various omissions, replacements, and changes can be made without departing from the scope of the invention. These embodiments and modifications thereof are included in the scope and gist of the invention, and are included in the scope of the invention described in the claims and equivalents thereof.

EXPLANATION OF REFERENCE SIGNS 1, 1a power supply system
2 load
3 main power supply device
4, 4a electricity storage device
5 sub power supply device
6, 6a switch unit
61, 63, 65 connecting/disconnecting unit
62, 64 diode unit
7, 7a microcomputer
L1, L2 electrical path
SW switching element
SW1 first switching element
SW2 second switching element

The invention claimed is:

1. A power supply system comprising:
a main power supply device that supplies DC power to a load;
a sub power supply device that is connected in parallel to the main power supply device and causes a built-in battery to discharge, thereby supplying DC power to the load;
a switch unit that is provided in an electrical path extending from the sub power supply device to the load through which discharge current of the battery flows, and performs an ON-operation and an OFF-operation; and
a microcomputer that controls the ON-operation and the OFF-operation of the switch unit,
wherein in response to the DC power to be supplied from the main power supply device dropping and a voltage to be input to the load falling below a predetermined threshold value, the microcomputer controls the switch unit so as to start the ON-operation for supplying the DC power from the sub power supply device to the load, and in response to the DC power to be supplied from the main power supply device recovering, the microcomputer controls the switch unit so as to start the OFF-operation for restricting the DC power to be supplied from the sub power supply device to the load, restrict supply of the DC power from the sub power supply device to the load so that the voltage to be input to the load does not fall below the predetermined threshold value until a predetermined time has elapsed since start of the OFF-operation, and set supply of the DC power from the sub power supply device to the load to zero after the predetermined time has elapsed.

2. The power supply system according to claim 1, wherein the switch unit includes a first switching element and a second switching element that are connected in series, each of the first switching element and the second switching element includes a connecting/disconnecting unit for connecting and disconnecting the electrical path, and a diode unit that is connected in parallel to the connecting/disconnecting unit and passes current in only one direction therethrough, the first switching element is set in a forward direction such that the diode unit of the first switching element passes discharge current of the battery therethrough, and the second switching element is set in a reverse direction such that the diode unit of the second switching element cuts off the discharge current of the battery, and
in the ON-operation, the microcomputer controls the switch unit so as to close each of the connecting/disconnecting unit of the first switching element and the connecting/disconnecting unit of the second switching element, and in the OFF-operation, the microcomputer controls the switch unit so as to open the connecting/disconnecting unit of the first switching element while closing the connecting/disconnecting unit of the second switching element until the predetermined time has elapsed since start of the OFF-operation, and open each of the connecting/disconnecting unit of the first switching element and the connecting/disconnecting unit of the second switching element after the predetermined time has elapsed.

3. The power supply system according to claim 2, wherein in the OFF-operation, the microcomputer controls the switch unit so as to repeat an operation of closing or opening the connecting/disconnecting unit of the first switching element and the connecting/disconnecting unit of the second switching element according to a preset duty ratio indicating a ratio of a closing period and an opening period of each of the connecting/disconnecting unit of the first switching element and the connecting/disconnecting unit of the second switching element until the predetermined time has elapsed since the start of the OFF-operation, and open each of the connecting/disconnecting unit of the first switching element and the connecting/disconnecting unit of the second switching element after the predetermined time has elapsed.

4. The power supply system according to claim 3, wherein the microcomputer selects a duty ratio from a plurality of preset duty ratios in order from a duty ratio having a largest ratio of the closing period to a duty ratio having a smallest ratio of the closing period, and performs an operation of closing or opening each of the connecting/disconnecting unit of the first switching element and the connecting/disconnecting unit of the second switching element according to the selected duty ratio.

5. The power supply system according to claim 2, wherein the first switching element has a parasitic diode as the diode unit.

6. The power supply system according to claim 1, wherein the switch unit includes a connecting/disconnecting unit that connects and disconnects the electrical path, and
in the ON-operation, the microcomputer controls the switch unit so as to close the connecting/disconnecting unit, and in the OFF-operation, the microcomputer controls the switch unit so as to repeat an operation of closing or opening the connecting/disconnecting unit according to a preset duty ratio indicating a ratio of a closing period and an opening period of the connecting/disconnecting unit until the predetermined time has elapsed since start of the OFF-operation, and open the connecting/disconnecting unit after the predetermined time has elapsed.

7. The power supply system according to claim 6, wherein the microcomputer selects a duty ratio from a plurality of preset duty ratios in order from a duty ratio having a largest ratio of the closing period to a duty ratio having a smallest ratio of the closing period, and performs an operation of closing or opening the connecting/disconnecting unit according to the selected duty ratio.

8. An electricity storage device for use in the power supply system according to claim 1, comprising the sub power supply device, the switch unit and the microcomputer.

9. The power supply system according to claim 3, wherein the first switching element has a parasitic diode as the diode unit.

10. The power supply system according to claim 4, wherein the first switching element has a parasitic diode as the diode unit.

* * * * *